United States Patent
Wimmer et al.

(10) Patent No.: US 7,384,369 B2
(45) Date of Patent: Jun. 10, 2008

(54) FRICTION WHEEL DRIVE ASSOCIATED WITH A UNIT BELT DRIVE OF AN INTERNAL COMBUSTION ENGINE FOR A SEPARATE SECONDARY UNIT

(75) Inventors: Rudolf Wimmer, Haidershofen (AT); Heinz Lemberger, Unterfoehring (DE)

(73) Assignees: Bayerische Motoren Werke Aktiengesellschaft, Munich (DE); Peugeot Citroen Automobiles Societe Anonyme, Velizy Villacoublay (FR)

(*) Notice: Subject to any disclaimer, the term of this patent is extended or adjusted under 35 U.S.C. 154(b) by 265 days.

(21) Appl. No.: 11/136,421

(22) Filed: May 25, 2005

(65) Prior Publication Data

US 2006/0054374 A1 Mar. 16, 2006

Related U.S. Application Data

(63) Continuation of application No. PCT/EP03/011407, filed on Oct. 15, 2003.

(30) Foreign Application Priority Data

Nov. 26, 2002 (DE) .................. 102 55 079

(51) Int. Cl.
    F02B 67/00 (2006.01)
(52) U.S. Cl. .............. 476/28; 123/198 R; 123/198 C
(58) Field of Classification Search .......... 474/138, 474/117; 476/28, 48, 16, 31; 123/198 C, 123/198 R; 417/364; 74/11, 13
See application file for complete search history.

(56) References Cited

U.S. PATENT DOCUMENTS

| | | | | |
|---|---|---|---|---|
| 255,860 A | * | 4/1882 | Holt | 241/227 |
| 1,289,818 A | * | 12/1918 | Kurkjian | 476/66 |
| 1,416,569 A | * | 5/1922 | Minnich | 476/65 |
| 1,624,738 A | * | 4/1927 | Jesperson | 123/195 R |
| 3,085,758 A | * | 4/1963 | Goerlich et al. | 242/356.7 |
| 3,187,674 A | * | 6/1965 | Hammelmann | 417/223 |
| 3,202,144 A | * | 8/1965 | Nicholson et al. | 123/41.49 |
| 3,452,610 A | * | 7/1969 | Whitehurst et al. | 74/15.2 |
| 3,730,037 A | * | 5/1973 | Purrer | 83/68 |
| 4,709,587 A | * | 12/1987 | Fiornascente | 74/15.63 |
| 5,263,377 A | * | 11/1993 | Kleber | 74/15.84 |

(Continued)

FOREIGN PATENT DOCUMENTS

DE 1087822 * 7/1957

(Continued)

Primary Examiner—Richard Ridley
Assistant Examiner—Terence Boes
(74) Attorney, Agent, or Firm—Crowell & Moring LLP

(57) ABSTRACT

A friction wheel drive for an internal combustion engine's a unit belt drive for a secondary unit includes a control system, a friction wheel that engages frictionally with an outer side of a belt in a wrap-around portion of a drive wheel of the internal combustion engine and that is controlled by the control system to engage or disengage frictionally with a drive wheel of the secondary unit, and a guidance system having an arc section for guiding the movement of the friction wheel with the control system. The arc section is arranged equidistant from the axis of rotation of the drive or driven wheel relative to the driven wheel to the outside of the belt in the wrap-around portion for turning the secondary unit on and off.

13 Claims, 1 Drawing Sheet

U.S. PATENT DOCUMENTS

2005/0215392 A1 * 9/2005 Wimmer et al. ............... 476/28
2006/0264283 A1 * 11/2006 Lemberger ................. 474/135

FOREIGN PATENT DOCUMENTS

| | | | |
|---|---|---|---|
| DE | 3934884 A1 * | 4/1991 | |
| DE | 10236746 | 2/2004 | |
| DE | 10236746 A1 * | 2/2004 | |
| DE | 10255073 A1 * | 6/2004 | |
| DE | 10255074 A1 * | 6/2004 | |
| DE | 10255075 A1 * | 6/2004 | |
| DE | 10309063 A1 * | 10/2004 | |
| FR | 2865518 A1 * | 7/2005 | |
| WO | WO 2006051094 A1 * | 5/2006 | |

* cited by examiner

FRICTION WHEEL DRIVE ASSOCIATED WITH A UNIT BELT DRIVE OF AN INTERNAL COMBUSTION ENGINE FOR A SEPARATE SECONDARY UNIT

CROSS REFERENCE TO RELATED APPLICATIONS

This application is a continuation of International Patent Application No. PCT/EP2003/011407, filed Oct. 15, 2003, designating the United States of America, and published in German as WO 2004/048758 A1, the entire disclosure of which is incorporated herein by reference. Priority is claimed based on German Patent Application No. 102 55 079.4, filed Nov. 26, 2002.

BACKGROUND AND SUMMARY OF THE INVENTION

The invention relates to a friction wheel drive associated with a unit belt drive of an internal combustion engine for a separate secondary unit, wherein a friction wheel cooperating frictionally in the wrap-around portion of a drive wheel of the internal combustion engine or other unit is in frictional connection with a drive wheel of the friction wheel drive of the secondary unit, wherein furthermore the friction wheel is taken out of engagement with the aforesaid friction partner in case of need by means of a control system.

A system of this kind has been proposed in a general configuration in Patent Application P 102 36 746, not disclosed earlier, without giving a concrete construction of the control system for the needed adjustment of the friction wheel relative to the drive wheel or to the belt.

It is the purpose of the invention to show a management, simple and reliable in operation, for a controlled friction wheel between an engagement active for the secondary unit and a disengaged position.

This purpose is accomplished in accordance with one aspect of the present invention in that the friction wheel is disposed in variable positions in a guiding device arranged on the machine side adjacent to the drive wheel or driven wheel relative to the drive gear or to the belt exterior in its particular circumferential contact area by means of the control device in order to turn the auxiliary unit on and off.

With the invention, a simple and reliably working management is achieved for a friction wheel arranged especially on the belt side of the friction wheel transmission that is associated with the secondary unit.

In a first embodiment of the invention, a simple and stable management system is achieved by the fact that it comprises guide plates disposed on both sides of the friction wheel at the same fixed distance apart, with equidistant, arcuate slots in which the friction wheel is disposed for displacement by means of the control system being guided in sliding movement by axial projections.

In order to avoid out-of-round running of the driving or driven wheel including the outer side of the belt, due to machine dynamics, on the one hand, and on the other hand to prevent increased wear, it is proposed in a further embodiment of the invention that the guiding system be spring mounted on the machine side. This can be accomplished, for example, by means of a silent block-like or rubber-and-metal arrangement which also serve to compensate inaccuracies.

A further proposal describes the settings of the friction wheel that are possible for a variable driving of the secondary unit, the control system comprising a servo motor arranged on the machine side for acting on a bell crank which is in communication with the friction wheel through a coupling rod serving to turn the secondary unit on and off and accordingly under tension or pressure. With this embodiment the control system can be advantageously adapted according to the space conditions at the combustion engine.

In order to damp shocks delivered to the coupling rod in some cases by the friction wheel, provision is made according to the invention for the coupling rod to be formed from two sections telescoping together, which thrust against one another with spring action when the secondary unit is turned on.

In another embodiment of the invention, the guiding system is a guiding link including the friction wheel in equidistant arrangement, which is equipped with bearings with rubber elastic cushioning. It can be in communication with a control system configured as previously described.

The invention finds use preferentially in a secondary unit serving as a coolant pump for an internal combustion engine whose drive wheel is controlled by the friction wheel through the Motronic map-controlled servo motor governed by parameters of the internal combustion engine. The servo motor can, in a known manner, operate hydraulically, pneumatically, electrically or magnetically.

The variable drive of the coolant pumps can be controlled in the scope of the invention, for example, also by only a single parameter. Preferably the temperature of the coolant of the internal combustion engine serves for this purpose.

BRIEF DESCRIPTION OF THE DRAWINGS

The invention is described with the aid of an embodiment represented only schematically in the drawing, wherein.

DETAILED DESCRIPTION OF THE DRAWINGS

Figure 2:
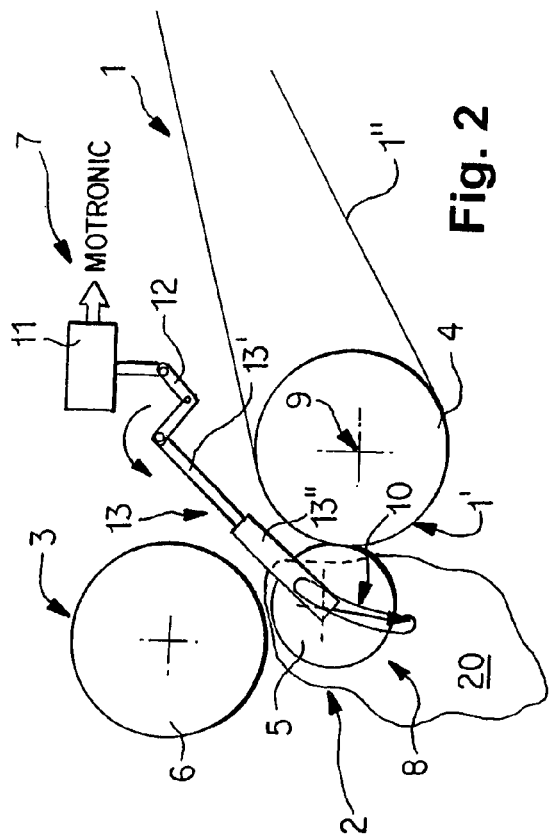
FIG. 2 shows the above-named belt drive with the friction wheel of the friction wheel drive disengaged.

A friction wheel drive 2 is associated with a unit belt drive 1 of an internal combustion engine 24, for a separate secondary unit 3. The friction wheel drive 2 comprises a friction wheel 5 frictionally cooperating with the outer side 1' of a belt 1" in the wrap-around portion of a drive wheel 4 of the internal combustion engine; the friction wheel 5 can be brought if necessary into frictional engagement with a drive wheel 6 of the friction wheel drive 2 of the secondary unit 3 by means of the control system 7.

To achieve a management means of simple construction and reliability of operation for the friction wheel 5, it is proposed that the friction wheel 5 be arranged for changeable position in a guiding means 8 on the machine end adjacent to the drive wheel 4 or drive wheel 6 in the wrap-around portion of the belt 1" along an arc section—slot 10—relative to the driven wheel 6 or to the outside 1' of the belt by means of the control system 7 for turning the secondary unit 3 on and off.

In a first, preferred embodiment the guiding system 8 comprises guiding plates 20 arranged on both sides of the shiftable friction wheel 5, and disposed at a mutually fixed distance apart, with equidistant, arcuate slots 10 in which the friction wheel 5 is arranged for sliding displacement with axial projections 22 by means of the control system 7.

To prevent stresses endangering the safety of operation of the guiding means 8 caused by machine dynamics and arising from out-of-round running of the drive wheel 4 or driven wheel 6 and from the belt 1", the guiding means 8 is arranged with a spring-elastic support on the machine side, for example by a rubber-and-metal element.

Figure 1:
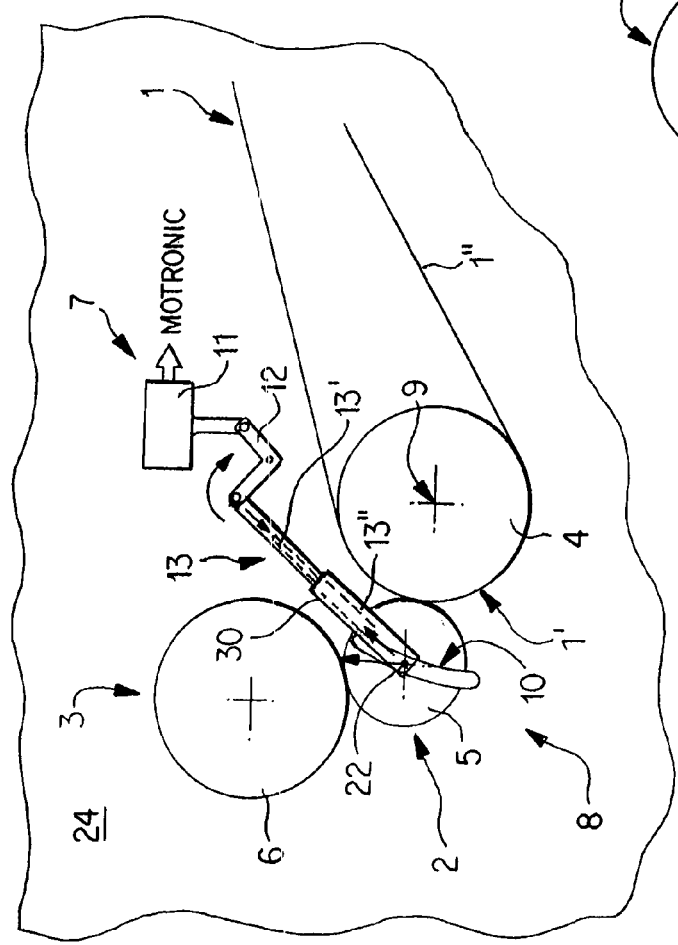
FIG. 1 shows a belt drive with friction wheel drive for a coolant pump with a friction wheel engaged for driving.

As it appears from FIGS. 1 and 2, the control system 7 comprises a servomotor 11 disposed on the machine side for action on a bell crank 12 which is in connection with the friction wheel 5 through a coupling rod 13 serving for turning the secondary unit 3 on and off and accordingly subjected to tension or pressure.

In order to suppress substantially other undamped stresses in the direction of servomotor 11, the coupling rod 13 is formed of two sections 13', 13" telescoping together, which are thrust against one another in a spring-elastic manner when the secondary unit 3 is turned on.

As FIGS. 1 and 2 furthermore show, the friction wheel 5, carried by slots 10 equidistantly from the drive wheel 4, is in constant frictional engagement with the outer side 1' of the belt 1" with the advantage that the belt pulley 5, in controlled friction engagement with the drive wheel 6 of the secondary unit 3, has a rotatory speed corresponding to the speed of the belt 1". With the arrangement shown, in the case of a controlled engagement of the secondary unit 3, only its drive wheel 6 with its coupled rotary parts is to be accelerated so that reduced acceleration forces occur. Thus, wear and noise are reduced. Furthermore, the constantly co-rotating friction wheel 5 remains free of deposits such as dirt, water, ice, etc.

The invention finds preferential use in a secondary unit 3 serving as a coolant pump for the internal combustion engine whose drive wheel 6 controls and is kept in engagement by means of a Motronic servomotor 11 map-controlled by parameters of the internal combustion engine. The operation of the servomotor 11 can be performed hydraulically, pneumatically, electrically or magnetically.

Lastly, reference is made also to another embodiment of a vehicle guidance apparatus, which is a steering means mounted coaxially with the axis of rotation of the drive wheel or driven wheel and comprising the friction wheel in an equidistant arrangement and which is equipped with rubber-elastic bearings. The controlling device described above can serve for the control of this vehicle guidance apparatus.

With the invention in the above-named embodiments, a secondary unit 3 serving preferably as a coolant pump can be shut off in case of a cold start of the internal combustion engine, with the advantage of a faster warming of the coolant and reduced power output from the internal combustion engine.

Also, the coolant pump 3 can be switched off in the high rpm range of the internal combustion engine by the controlled moving of the friction wheel 5 away from the drive wheel 6, or can be driven periodically at reduced rpm by a controlled intermittent engagement.

Compared with an electrically powered coolant pump, the arrangement according to the invention is substantially more compact and less expensive.

Lastly, with an additional embodiment of the invention, the advantage of fail-safe without additional energy is achieved by the fact that the friction wheel 5 is arranged by a biased spring 30, in constant engagement with the drive wheel 6 of the secondary unit 3, while in case of the need for an interruption of the drive in the friction wheel drive 2 the friction wheel 5, still driven on the belt side, is operated out of engagement with the secondary unit drive wheel 6. In this case the control system 7 through the coupling rod 13 acts on the axle of the friction wheel 5 according to the first embodiment, or on the vehicle guidance means of the second embodiment which is not shown.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A friction wheel drive for an internal combustion engine having a unit belt drive for a secondary unit, the friction wheel drive comprising:
    a control system;
    a friction wheel that engages frictionally with an outer side of a belt in a wrap-around portion of a drive wheel of the internal combustion engine and that is controlled by the control system to engage or disengage frictionally with a driven wheel of the secondary unit; and
    a guidance system having arcuate slots defining an arc section for guiding the movement of the friction wheel with the control system, wherein a length of the arc section is arranged to be defined by points equidistant from the axis of rotation of the drive wheel, along the outside of the belt in the wrap-around portion, for turning the secondary unit on and off.

2. The friction wheel drive according to claim 1, wherein the friction wheel is disposed by a biased spring in permanent engagement with the driven wheel of the secondary unit, and wherein with the control system through a pressure-loaded coupling rod selectively disengages the friction wheel.

3. A friction wheel drive for an internal combustion engine having a unit belt drive for a secondary unit, the friction wheel drive comprising:
    a control system;
    a friction wheel that engages frictionally with an outer side of a belt in a wrap-around portion of a drive wheel of the internal combustion engine and that is controlled by the control system to selectively engage frictionally a driven wheel of the secondary unit; and
    a guiding system having an arc section for guiding the movement of the friction wheel with the control system, for turning the secondary unit on and off, wherein the guiding system includes guiding plates arranged on both sides of the friction wheel at an oppositely set distance with equidistant, arcuate slots in which the friction wheel is arranged displaceably, guided in sliding movement by axial projections, by the control system.

4. The friction wheel drive according to claim 3, wherein the guiding system is supported in a spring-elastic manner.

5. The friction wheel drive according to claim 4, wherein the control system comprises a servomotor arranged for action on a bell crank, which is in communication with the friction wheel through a coupling rod serving to turn on and off the secondary unit and accordingly subjected to tension or pressure.

6. The friction wheel drive according to claim 5, wherein the coupling rod includes two sections telescoping together, which are thrust against one another resiliently when the secondary unit is turned on.

7. The friction wheel drive according to claim 6, comprising a steering element mounted coaxially with the axis of rotation of the driven wheel.

8. The friction wheel drive according to claim 7, wherein the secondary unit is a coolant pump serving the internal combustion engine, the driven wheel of which is controlled and kept in engagement with the friction wheel, through the servomotor controlled by parameters of the internal combustion engine in a field of an electronic engine control system, the servomotor being actuated one of hydraulically, pneumatically, electrically and magnetically.

9. The friction wheel drive according to claim 8, wherein the friction wheel is disposed by a biased spring in permanent engagement with the driven wheel of the secondary unit, and wherein the control system, through a pressure-loaded coupling rod, selectively disengages the friction wheel.

10. The friction wheel drive according to claim 3, wherein the control system comprises a servomotor arranged for action on a bell crank, which is in communication with the friction wheel through a coupling rod serving to turn on and off the secondary unit and accordingly subjected to tension or pressure.

11. The friction wheel drive according to claim 10, wherein the coupling rod includes two sections telescoping together, which are thrust against one another resiliently when the secondary unit is turned on.

12. The friction wheel drive according to claim 3, comprising a steering element mounted coaxially with the axis of rotation of the driven wheel.

13. The friction wheel drive according to claim 3, wherein the secondary unit is a coolant pump serving the internal combustion engine, the driven wheel of which is controlled and kept in engagement with the friction wheel, through the servomotor controlled by parameters of the internal combustion engine in a field of an electronic engine control system, the servomotor being actuated one of hydraulically, pneumatically, electrically and magnetically.

* * * * *